United States Patent [19]
Chen et al.

[11] 3,723,719
[45] Mar. 27, 1973

[54] GROUND RANGE COMPUTER

[75] Inventors: Wei L. Chen, Sunnyvale; John R. Carter, San Jose, both of Calif.

[73] Assignee: The Singer Company, Binghamton, N.Y.

[22] Filed: Feb. 3, 1972

[21] Appl. No.: 223,070

[52] U.S. Cl. ............235/190, 235/183, 235/191, 235/196, 35/10.4
[51] Int. Cl. ..................G06g 7/22, G06g 7/36
[58] Field of Search......235/183, 184, 189, 190, 191, 235/186, 192, 193 196, 197, 150.2

[56] References Cited

UNITED STATES PATENTS

| | | | |
|---|---|---|---|
| 2,938,671 | 5/1960 | Strom | 235/191 |
| 3,036,776 | 5/1962 | Schroeder | 235/191 |
| 3,058,661 | 10/1962 | Summers | 235/190 |
| 3,488,482 | 1/1970 | Ley | 235/183 |

*Primary Examiner*—Felix D. Gruber
*Attorney*—Francis L. Masselle et al.

[57] ABSTRACT

The disclosed embodiment of the present invention is a device for use in aircraft flight simulators which computes, as a function of time, ground range from the aircraft's nadir to an object in front of the aircraft, when given the aircraft's altitude and the slant range to the object. The relationship between ground range, altitude and slant range is essentially a right triangular and can be expressed mathematically by he Pythagorean Theorem. The mathematical expression for the right triangle is differentiated with respect to time and rearranged into an integral equation for solution of the ground range variable. Integrating and dividing circuitry is provided for implementation of the integral equation. Also, compensation and switching circuitry is provided for initialization of the integrators.

7 Claims, 3 Drawing Figures

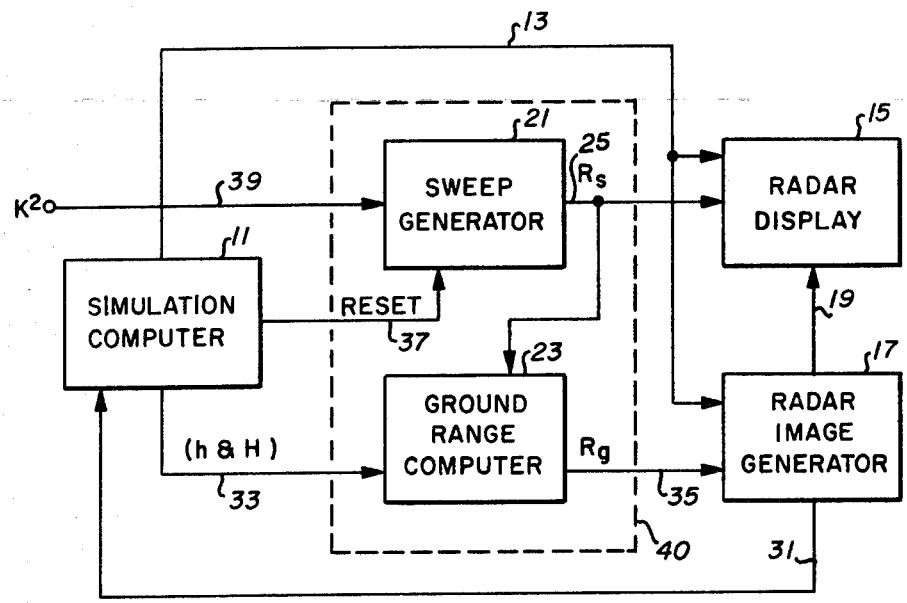
Fig_1
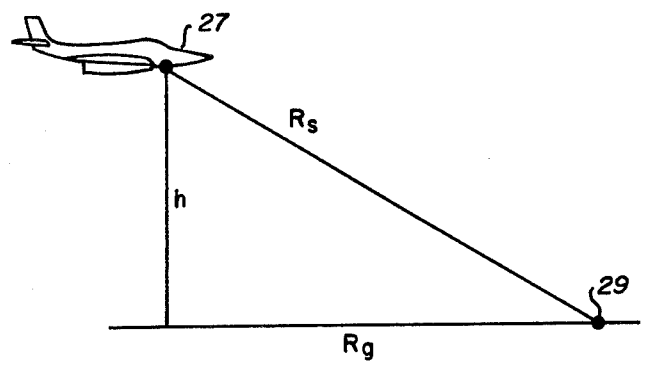
Fig_2

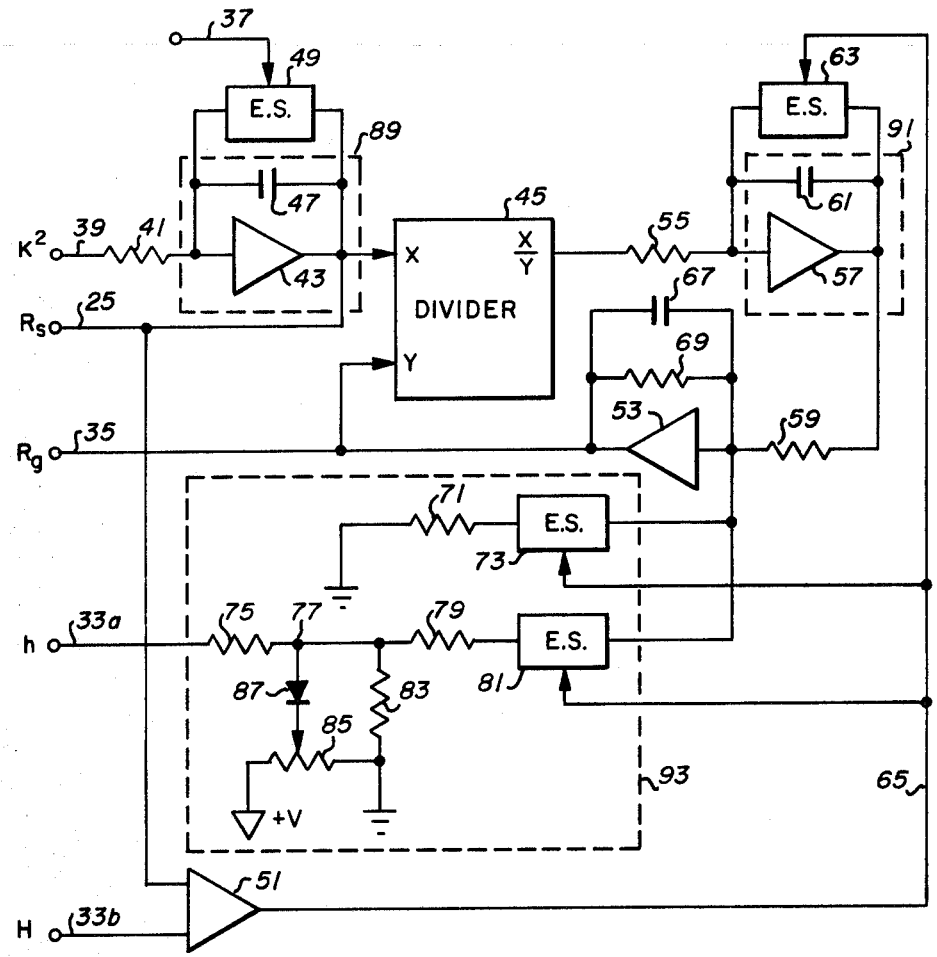
Fig_3

GROUND RANGE COMPUTER

BACKGROUND OF THE INVENTION

This invention relates to simulators in general and more particularly to an improved apparatus for generating a range function required in some of such simulators.

In various types of simulator systems it is required to generate a ground range, for example, the nadir of a simulated aircraft to a point ahead of the aircraft. This range may be required to generate sweeps for simulated radar equipment or for use in generating visual display signals. The information generally available for use in generating ground range is slant range and altitude. For example, in a radar system, the return signal of a radar sweep will represent slant range. If the radar information obtained on such a sweep is displayed on a radar display with this type of scan, a distorted picture will be displayed. Thus a non-linear sweep which will position the display sweep at the proper ground range for each point of the radar slant range is required.

The radar scan that develops the slant range $R_s$ will be a linear sweep, i.e., $R_s = Kt$. Where $K$ = constant of the speed of travel of a radar pulse and $t$ = the time required for the pulse to travel to and return from a particular point on the ground. Altitude $h$ is a known value and can be assumed to be constant for a single sweep. Thus a triangle whose hypotenuse is $R_s$, whose altitude is $h$ and whose base is ground range $R_g$ may be constructed. The Pytharogrean Theorem is well known and can be expressed as $R_g^2 = R_s^2 - h^2$, or, $R_g = \sqrt{R_s^2 - h^2}$. But since $R_s = Kt$, then $R_g^2 = K^2t^2 - h^2$.

In the past, the required $R_g$ data was obtained in real time by means of direct analog implementation of the above equation.

The value for $Kt$ was generated by integrating $K$ with respect to time during a given sweep. The result was squared, as was $h$, and the difference was computed. The square root of $K^2t^2 - h^2$ was computed by the use of a square root network. The main deficiency in this implementation was the noise and errors caused primarily by the square root network. Errors of 5 percent or more were not uncommon.

SUMMARY OF THE INVENTION

The present invention implements the equation for $R_g$ in a manner that avoids using a square root network, resulting in improved accuracy and the lack of electrical noise. This is accomplished by differentiating both sides of the equation for $R_g^2$. The solution of the resultant differential equation yields $dR_g/dt$, and $R_g$ is produced by integrating the expression for $dR_g/dt$, therefore, implementation can be effected by the use of analog hardware in which only integrators and an analog divider are required, both of which can be constructed to give relatively high accuracy. Additional means are provided to further improve performance as will be described in greater detail hereinbelow.

BRIEF DESCRIPTION OF THE DRAWINGS

FIG. 1 is a block diagram of a system in which the present invention may be used.

FIG. 2 is a diagram of the relationship between $R_g$, $R_s$ and $h$.

FIG. 3 is a circuit diagram of a preferred embodiment of the present invention.

DESCRIPTION OF THE PREFERRED EMBODIMENT

FIG. 1 illustrates the basic elements of a radar image generation system for use with a flight simulator. Simulation computer 11 provides such information as aircraft position, altitude, etc. This information is transmitted via line 13 to radar display 15 and radar image generator 17. Display 15 may be a conventional cathode ray tube such as that used in radar devices. The mode of operation, or the desired display pattern, is controlled from the simulated aircraft cockpit (not shown) and is relayed to display 15 via line 13. Radar image generator 17 may be a device such as that disclosed in U.S. Pat. No. 3,291,884, for RADAR SIMULATOR of Edward E. Gray. Radar image generator 17 provides video information for display 15 via line 19.

Sweep generator 21 provides simulated radar sweeps to both radar display 15 and ground range computer 23 via line 25. This signal is representative of slant range from the aircraft to a position on the ground and is designated herein by the symbol $R_s$.

Referring now to FIG. 2, the relationship between the slant range from aircraft 27 to an object on the ground 29 is shown diagrammatically by a right triangle. The altitude of the triangle is representative of aircraft altitude, designated herein by the symbol $h$; the hypotenuse of the triangle represents slant range $R_s$; and the base of the triangle represents ground range to the object on the ground 29 which is designated herein by the symbol $R_g$.

Terrain elevation $e_o$, which is produced within radar image generator 17, is supplied to simulation computer 11 via line 31. Aircraft altitude $h$ and the difference between $h$ and $e_o$ is supplied to ground range computer 23 via line 33. Hereafter, the symbol $H$ will represent $h - e_o$.

Ground range computer 23 computes ground range $R_g$ from the inputs of slant range $R_s$ and altitude $H$. The aircraft altitude $h$ is also used for a correction circuit to be explained in greater detail hereinbelow. Ground range data is supplied to radar image generator 17 via line 35.

The synchronization of the operation of the radar image generation system is effected by a reset signal from simulation computer 11 to sweep generator 21 via line 37. The constant $K^2$ is provided as an input to sweep generator 21 via line 39, which will be explained in greater detail hereinbelow.

The preferred embodiment of the ground range computer 23 and sweep generator 21, which is enclosed within dashed line 40, is shown in greater detail in FIG. 3. To eliminate the need for a square root circuit such as that employed in the prior art; the equation $R_g^2 = R_s^2 - h^2$ may be modified by first differentiating both sides of the equation.

$(2R_g)dR_g/dt = (2R_s)dR_s/dt - (2h)dt/dt$

Since $h$ is assumed to be a constant for a single sweep of the radar, then $dh/dt = 0$ and the last term of the differential equation drops out. Therefore, the equation becomes:

$(2R_g)dR_g/dt = (2R_s)dR_s/dt.$

Since $R_s$ is a linear function of time, i.e., $R_s = Kt$, then:

$dR_s/dt = K$

Upon dividing both sides of the equation by $2R_g$ and substituting $K$ for $dR_s/dt$, then $dR_g/dt = R_s/R_g(K)$ The equation can now be expressed as:

$$R_g = \int K^2 t / R_g \, dt$$

Referring now to FIG. 3, line 39 is connected to one side of resistor 41 and the other side thereof is connected to amplifier 43. The output of amplifier 43 is connected to the numerator input of divider 45. Capacitor 47 is connected between the input and output terminals of amplifier 43. Electronic switch 49 is connected in parallel with capacitor 47. The reset signal supplied on line 37 of FIG. 1 is connected to switch 49 for operation thereof.

Line 25 is also connected to the output of amplifier 43, and to one of two inputs of amplifier 51. Line 35, which is the output of ground range computer 23, is connected to the denominator input of divider 45 and to the output of amplifier 53. Resistor 55 is connected between the output (quotient) of divider 45 and the input of amplifier 57. Resistor 59 is connected between the output of amplifier 57 and the input of amplifier 53. Capacitor 61 is connected between the input and output terminals of amplifier 57.

Electronic switch 63 is connected in parallel with capacitor 61. Electronic switch 63 is operated by a signal on line 65 which is connected to the output of amplifier 51. Capacitor 67 is connected between the input and output terminals of amplifier 53. Resistor 69 is connected in parallel with capacitor 67. Resistor 71 is connected between ground potential and electronic switch 73. The second side of switch 73 is connected to the input of amplifier 53.

Signals indicative of aircraft altitude above sea level $h$ and above ground terrain H are supplied on lines 33a and 33b, respectively. Line 33b, is connected to a second input of amplifier 51. Line 33a is connected to one side of resistor 75. The second side of resistor 75 is connected to terminal point 77. Resistor 79 is connected between terminal point 77 and electronic switch 81. Resistor 83 is connected between terminal point 77 and ground potential. Potentiometer 85 is connected between plus voltage and ground potential. The anode terminal of diode 87 is connected to the wiper terminal of potentiometer 85. The cathode of diode 87 is connected to terminal point 77. Switches 73 and 81 are operated by a signal supplied on line 65 from amplifier 55.

It is pointed out that amplifier 43 and capacitor 47, as well as amplifier 57 and capacitor 61, are connected as integrator configurations. Integrator 89 is indicated by the dashed line enclosing amplifier 43 and capacitor 47; and integrator 91 is indicated by the dashed line enclosing amplifier 57 and capacitor 61. Amplifier 53 is connected as a conventional inverter. Amplifier 51 is connected in a comparator configuration. The amplifiers, which are operational amplifiers, and the divider are commonly used components that may be purchased from any number of manufacturers. Electronic switches 49, 63, 73, and 81 may be transistor devices that have high speed switching capabilities. These components likewise are readily available on the market.

Sweep generator 23 of FIG. 1 integrates $K^2$ over the same time period as that for $R_s$ to obtain $-K^2 t$. The integral equation for $R_g$, derived hereinabove, includes the term $K^2$ which is to be integrated. Therefore, a fixed D.C. voltage representing the value for $K^2$ is applied to the input of integrator 89 on line 39, as shown in FIG. 3. The output of integrator 89 ($-K^2 t$) is provided as the numerator input to divider 45. The denominator input to divider 45 is $-R_g$. Therefore, the output of the divider is indicative of $K^2 t/R_g$. This value is integrated by integrator 91 to obtain $\int (K^2 t/R_g) dt$, which as indicated hereinabove is equal to $R_g$. This output is inverted through amplifier 53 to obtain $-R_g$ whereby the feedback loop is closed to the denominator input of divider 45. The value for $-R_g$ may then be taken from the output of amplifier 53 as the final output for use in display 15. Switch 49 is opened by a signal on line 37 from sweep generator 23 as shown on FIG. 1; and closed at the end of the $R_s$ sweep to discharge capacitor 47, or in other words to initialize integrator 89. Comparator 51 has H and $R_s$ as inputs whereby switch 63 is energized only when $R_s$ equals to or exceeds the value of H. Therefore, integrator 91 will have a non-zero output value only when $t > H/K$.

A major source of error in this system is that caused by limitations of divider 45. Initially, the divider will be driven into saturation thereby not providing the desired output. This occurs, however, during the time when $R_s$ is less than the value of H. However, once saturated, the divider will not recover immediately and an error in $R_g$ results. That portion of the circuit, which is enclosed within dotted lines 93, and capacitor 67 are used to compensate for this error.

The degree of saturation and time required to recover from saturation increases as altitude $h$ increases. Thus a function of altitude $h$ is provided as an input to amplifier 53 on line 33a. Scaling is provided by resistors 75 and 83 with diode 87 and voltage divider potentiometer 85 whereby an upper limit may be set.

The altitude function is switched into amplifier 53 by switch 81 at the same time that switch 63 is opened. The resulting DC step voltage will be integrated by capacitor 67 to provide a correction for the error caused by the delay in divider 45 coming out of saturation. This will generate an undesirable transient in the $R_g$ output. To overcome this transient switch 73 is connected through resistor 71 to ground potential. Switch 73 is opened at the same time that switch 81 is closed to compensate for the capacitance of switch 81.

Further improvement may be obtained by holding the output of divider 45 at about one fifth its maximum output value during dead time. The best divider scaling was also found to be a slope ratio of 5 to 1, which for a 10 volt divider will result in a final output approaching 2 volts. Therefore, integrator 91 should then be made five times as fast as that of integrator 89.

Thus a system for computing a ground range as a function of time for use in radar simulators and the like, which avoids a square root computation and reduces error, has been shown. In actual test, error was reduced below 1 percent as opposed to 5 percent in the prior art system. The present invention, as disclosed, relates particularly to aircraft radar simulation. However, it is pointed out that this invention may be used in other devices which require the computation of the base of a right triangle wherein the hypotenuse is generated as a function of time and the altitude is a known constant for a single computation. For example, one such device may be a visual display system associated with aircraft flight simulators.

Although a specific embodiment has been shown it will be evident to those skilled in the art that various modifications may be made without departing from the spirit of the invention which is intended to be limited solely by the appended claims.

What we claim is:

1. In a system wherein there is generated as a function of time a slant range $R_s$ to various points on the ground from a point at a known altitude $h$, said $R_s$ being equal to K, a constant, times time, $t$, apparatus to generate continuously a ground range signal $R_g$ of said points on the ground from the nadir of said point at altitude $h$ comprising:
   a. a first integrator having an input $K^2$ and adapted to integrate over the same time period as $R_s$ is generated;
   b. a divider having the output of said first integrator as a numerator input;
   c. a second integrator having said divider output as an input; and
   d. an inverter having said second integrator output as an input and providing its output as the denominator input of said divider whereby the output of said inverter will be minus said ground range $R_g$.

2. The invention according to claim 1 wherein said first and second integrators comprise operational amplifiers with capacitor feedback and include switches across said capacitors to start integration upon opening and to initialize said integrators on closing.

3. The invention according to claim 1 and where the switch associated with said second integrator is controlled by means generating said slant range and further including a comparator having said slant range $R_s$ and a function of altitude as inputs to provide an output to open the switch associated with said second integrator only when said slant range exceeds said altitude.

4. The invention according to claim 3 wherein said inverter comprises an operational amplifier having input and feedback resistors and further including:
   a. means to apply a second input step voltage to said inverter, which is a function of altitude, at the time when the switch associated with said second integrator is opened; and
   b. a capacitor across said feedback resistor to integrate the step voltage.

5. The invention according to claim 4 wherein said means to apply said function of altitude comprise:
   a. a voltage divider having a voltage proportional to altitude as an input; and
   b. a third switch controlled by said comparator to close when said second integrator switch opens.

6. The invention according to claim 5 and further including a fourth switch having one side connected to said inverter input and the other through a resistor to ground and controlled by said comparator to open when said third switch closes.

7. In a system wherein there is generated as a function of time the length of the hypotenuse of a right triangle and one side of the right triangle is a known constant value and said hypotenuse is equal to a second constant times time, apparatus to generate the length of the third side of said right triangle comprising:
   a. a first integrator having as an input said second constant squared and adapted to integrate over the same time period as said hypotenuse is generated;
   b. a divider having the output of said first integrator as a numerator input;
   c. a second integrator having said divider output as an input; and
   d. an inverter having said second integrator output as an input and providing its output as the denominator input of said divider whereby the output of said inverter will be minus the length of said base side of said right triangle.

* * * * *

UNITED STATES PATENT OFFICE
CERTIFICATE OF CORRECTION

Patent No. 3,723,719         Dated March 27, 1973

Inventor(s) Wei L. Chen and John R. Carter

It is certified that error appears in the above-identified patent and that said Letters Patent are hereby corrected as shown below:

Abstract, line 3, change "he", to --the--.

Column 2, line 57, change "dt/dt", to --dh/dt--.

Signed and sealed this 20th day of November 1973.

(SEAL)
Attest:

EDWARD M. FLETCHER, JR.         RENE D. TEGTMEYER
Attesting Officer               Acting Commissioner of Patents